United States Patent [19]

Lindstol

[11] 3,709,362
[45] Jan. 9, 1973

[54] SELF-BACKWASHING FILTER APPARATUS

[75] Inventor: Anders Lindstol, Oakville, Ontario, Canada

[73] Assignee: Ecodyne Corporation, Chicago, Ill.

[22] Filed: May 12, 1970

[21] Appl. No.: 36,553

[52] U.S. Cl. .................................210/108, 210/254
[51] Int. Cl. ............................................B01d 23/26
[58] Field of Search..................210/80, 82, 108, 254

[56] References Cited

UNITED STATES PATENTS

| 3,428,177 | 2/1969 | Duff | 210/108 |
| 3,260,366 | 7/1966 | Duff et al. | 210/80 |
| 3,502,212 | 3/1970 | Veda | 210/108 X |

FOREIGN PATENTS OR APPLICATIONS

| 95,596 | 10/1960 | Netherlands | 210/108 |

Primary Examiner—John Adee
Attorney—James P. Hume et al.

[57] ABSTRACT

An improved self-backwashing filter of the type having a lower filter chamber and an upper backwash storage chamber. In one embodiment, the service outlet pipe means comprise an inverted U-shaped siphon pipe, the top of which is at least as high as the upper level of the filter means. Air vent means communicate with the siphon, and liquid level sensing means are positioned in the filter chamber above the filter means. The liquid level sensing means are operatively connected to the air vent means to open the air vent means, breaking the siphon when the liquid level falls past the liquid level sensing means. In another embodiment, a head box is provided, and the liquid inlet means comprise an inlet pipe, a head box, and a downtake pipe. Liquid from the inlet pipe flows over the first weir to the downtake pipe. If the downtake pipe does not accept all of this liquid, the overflow flows over the second weir, and is diverted to another filter or to the drain.

8 Claims, 6 Drawing Figures

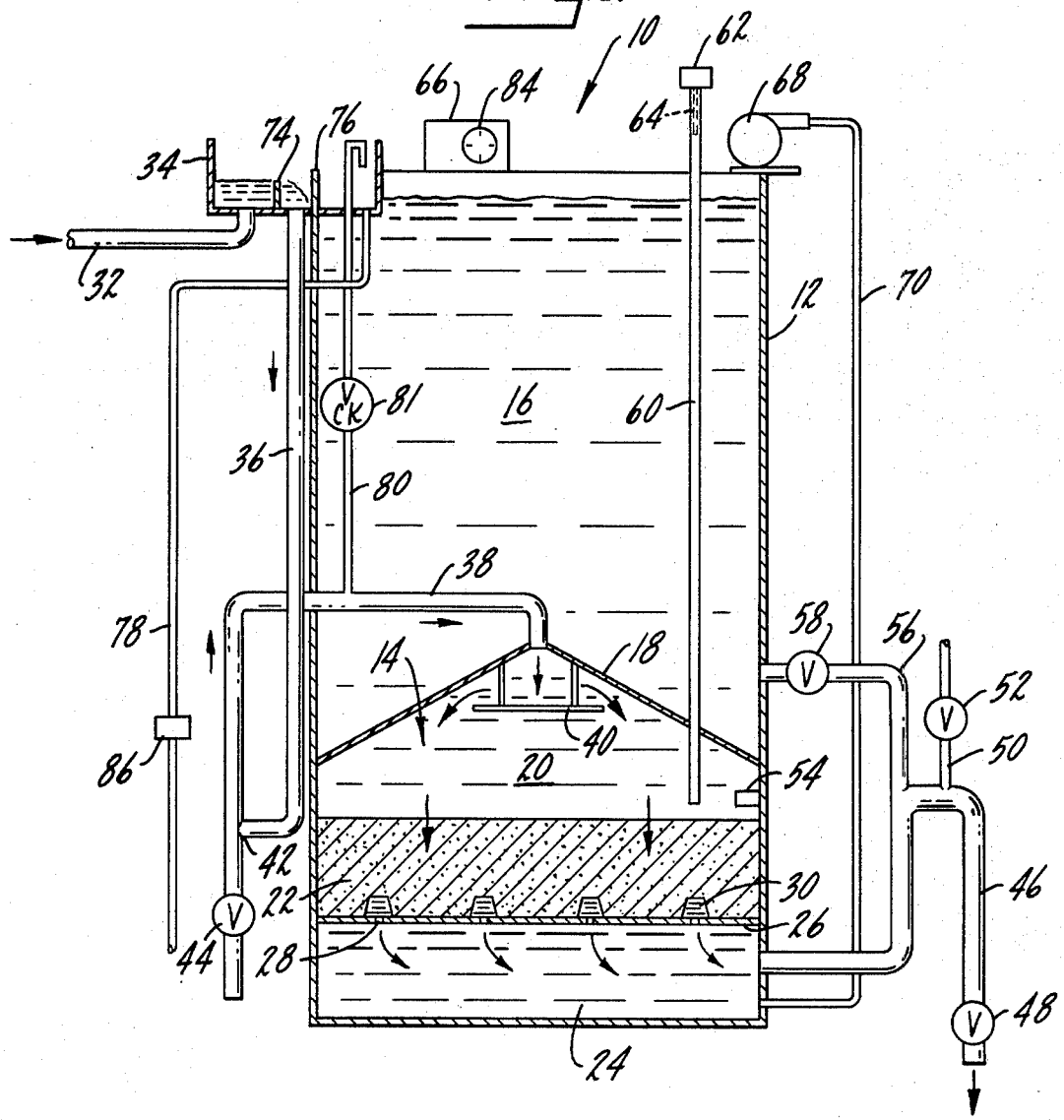

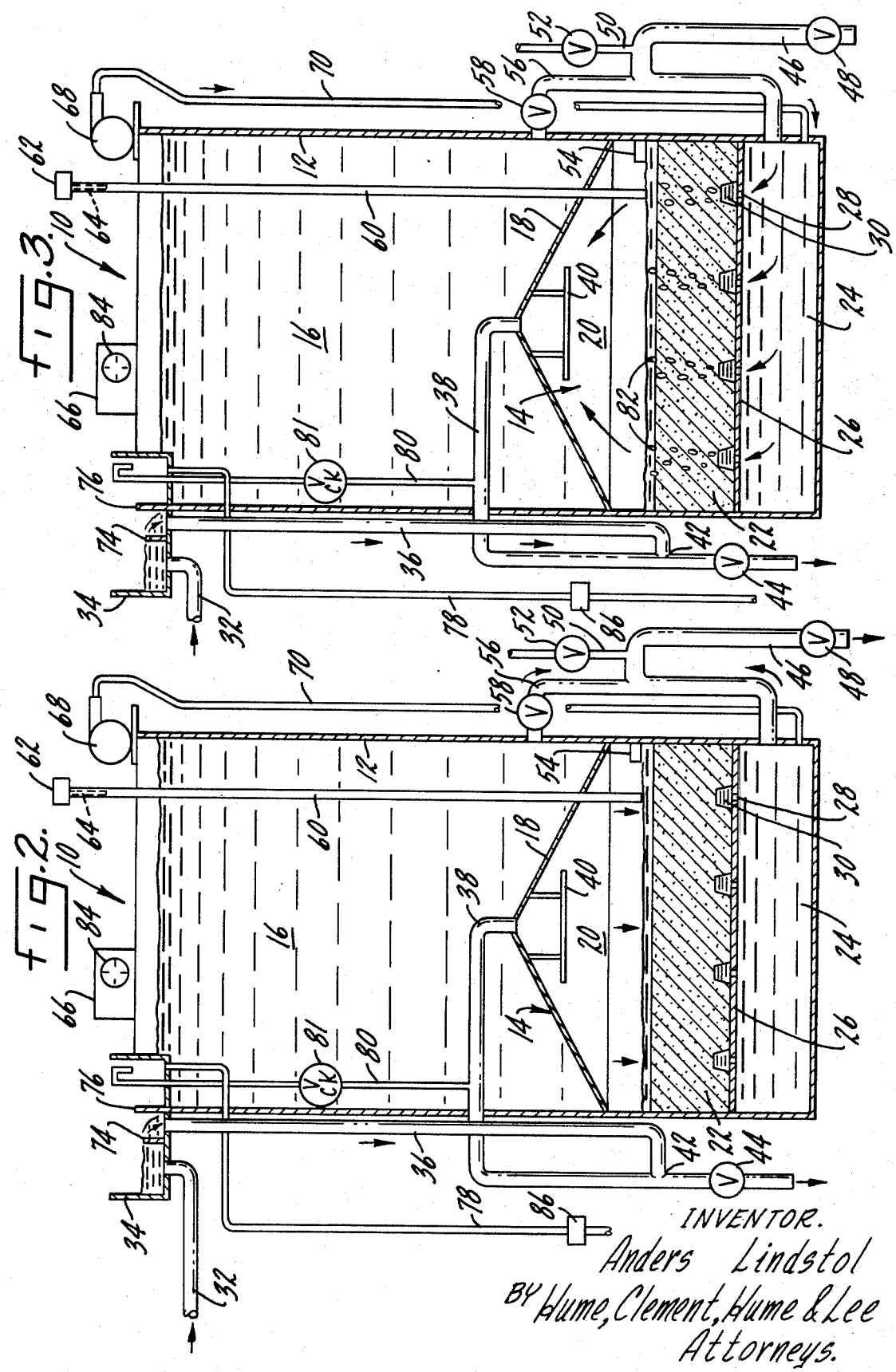

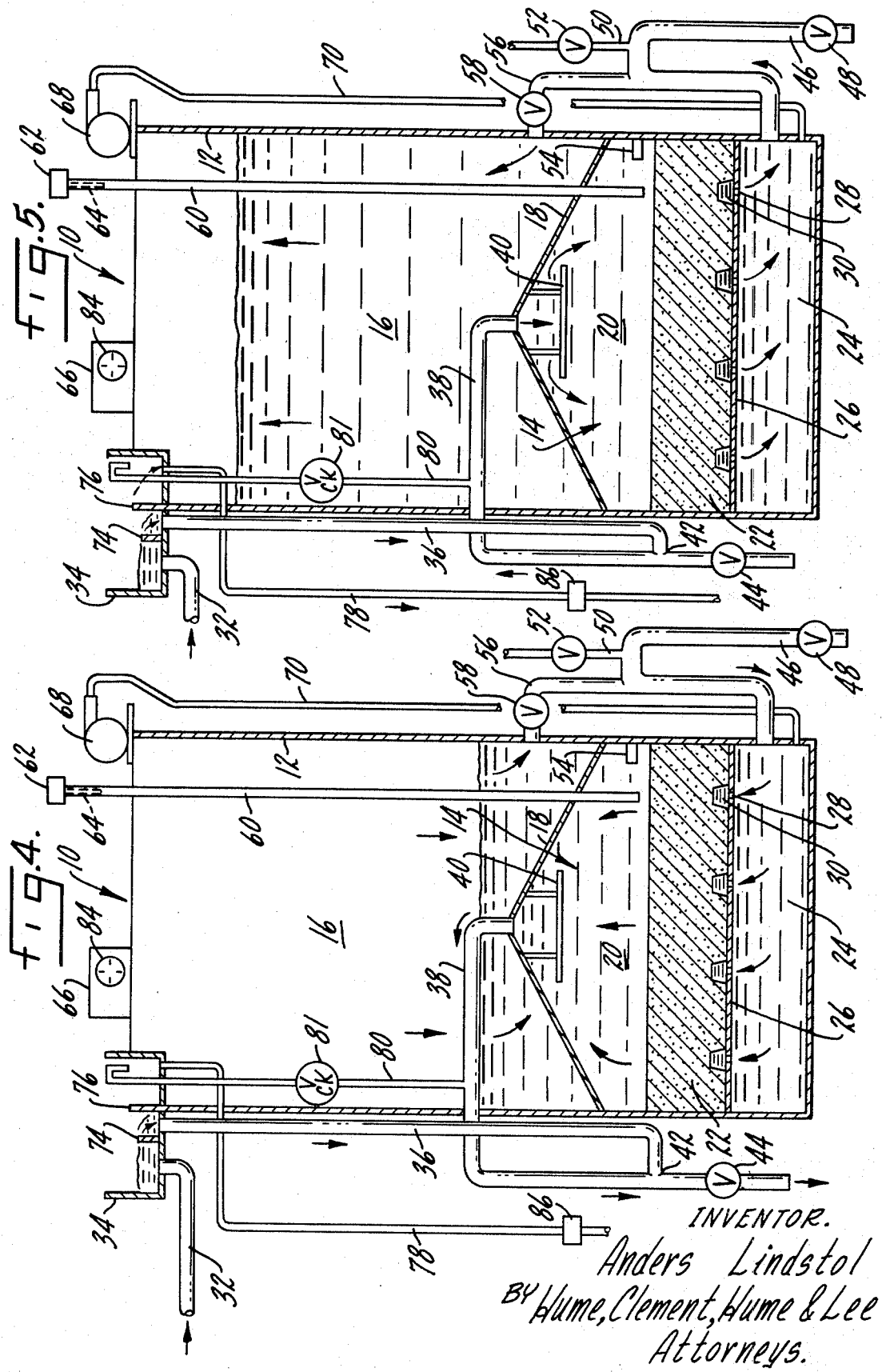

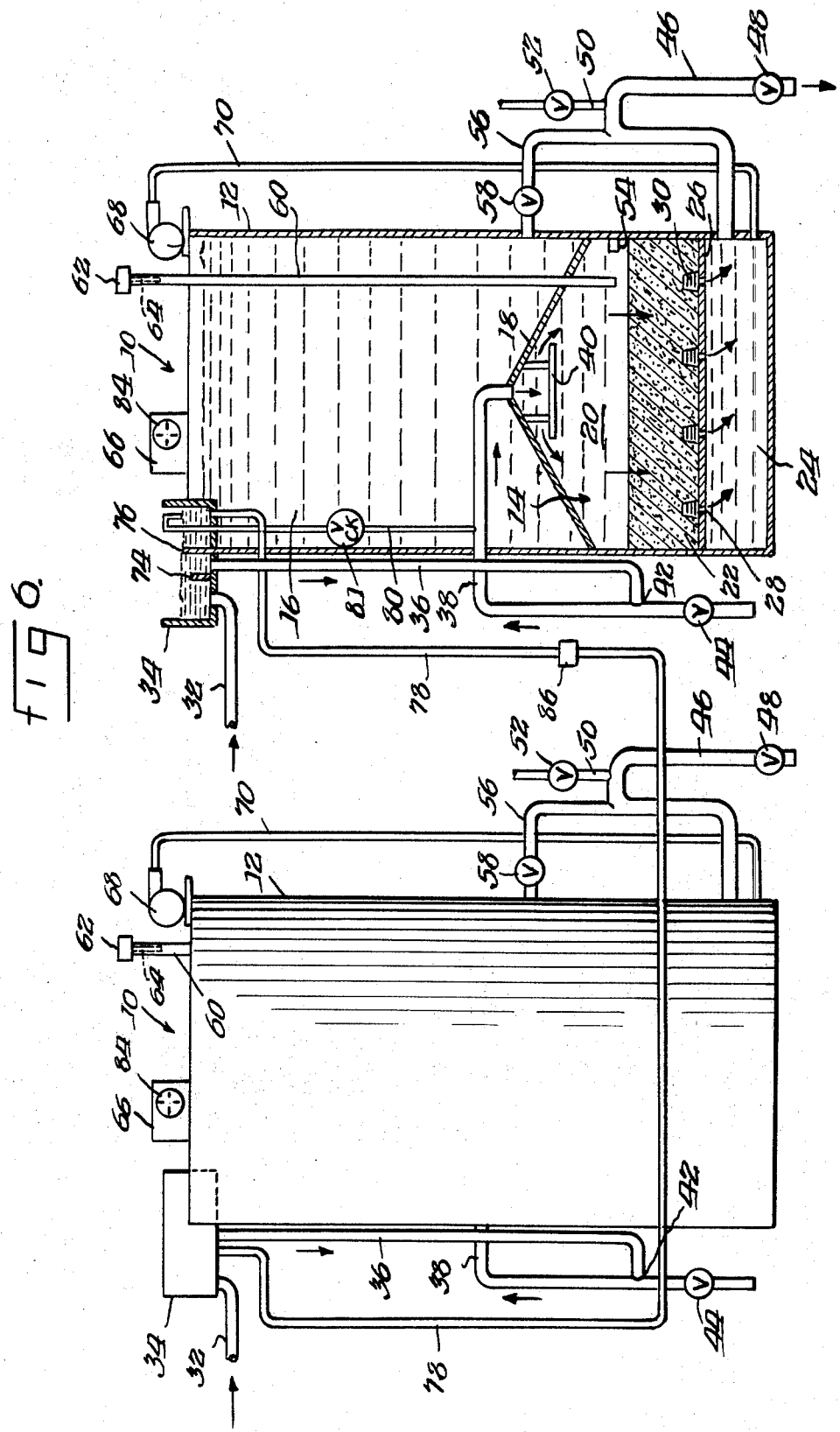

SELF-BACKWASHING FILTER APPARATUS

The present invention relates to an improved apparatus for filtering a liquid.

An important contribution to the liquid filtration art has been the self-backwashing filter. Various aspects of such a filter are described in U.S. Pat. Nos. 3,193,099 to Soriente et al.; 3,260,366 to Duff et al.; 3,342,334 to Soriente et al.; and 3,428,177 to Duff, all of which are assigned to the assignee of this application. Such filters have a backwash reservoir, and provide means for cleaning the filter bed by passing the liquid from the backwash reservoir upwardly through the filter bed in a reverse-flow direction. Many such filters also provide means for gas-scouring the filter bed prior to backwashing. The gas-scouring step is carried out by draining a portion of the liquid from the inlet compartment above the filter bed and forcing a gas upwardly through the filter bed.

Generally, the present invention provides an improved self-backwashing filter apparatus which incorporates pipe means for regulating the filter chamber drain-down cycle prior to the air-scouring step. The invention also provides a low-profile type of filter which incorporates a head box of improved design.

Basically, the improved self-backwashing filter of the present invention comprises means defining a filter chamber having an upper inlet side, a lower outlet side, and filter means therebetween, along with means defining a backwash storage chamber above the filter chamber, the backwash storage chamber supplying liquid under sufficient pressure to force the liquid upwardly through the filter bed. First pipe means are provided for delivering inlet liquid to the upper inlet side of the filter chamber, and second pipe means are provided for delivering liquid from the lower outlet side of the filter chamber to service. Third pipe means provide communication between the lower outlet side of the filter chamber and the backwash storage chamber.

In accordance with one embodiment of the present invention, the second pipe means comprise an inverted U-shaped siphon pipe for delivering liquid from the lower outlet side of the filter chamber to service. The top of the siphon pipe is at least as high as the upper level of the filter means. Air vent means communicate with the siphon, and liquid level sensing means are positioned in the inlet compartment. The liquid level sensing means are operatively connected to the air vent means to open the air vent means when the liquid level falls past the liquid level sensing means. The opening of this air vent breaks the siphon.

In accordance with another embodiment of the present invention, the aforementioned first pipe means comprise an inlet pipe, a head box, and a downtake pipe, and the head box has a pair of weirs therein. The weirs are constructed and arranged so that the liquid from the inlet pipe flows over the first weir to the downtake pipe. Overflow liquid flows over a second weir when the downtake pipe fails to accept all of the liquid that flows over the first weir. The liquid flowing over the second weir may be diverted to another filter or to the drain, and the flow of liquid over this second weir may be employed to sense that the backwash chamber has been filled. In any event, when the second weir is employed, the head box must be positioned slightly above the normal full level of the backwash storage chamber.

The invention, both as to its organization and method of operation, taken with the objects and advantages thereof, will be best understood by reference to the following detailed description, taken in conjunction with the accompanying drawings, in which:

FIG. 1 is a side elevation view, partially in section, illustrating a filter apparatus embodying the features of the present invention, the apparatus being illustrated during the filtering or service cycle;

FIG. 2 is a side elevation view similar to FIG. 1, showing the filter apparatus during the drain-down cycle;

FIG. 3 is a side elevation view similar to FIG. 1, showing the apparatus during the gas-scouring cycle;

FIG. 4 is a side elevation view similar to FIG. 1, showing the apparatus during the backwashing cycle;

FIG. 5 is a side elevation view similar to FIG. 1, showing the apparatus during the backwash chamber refill cycle; and FIG. 6 is a side elevation view, partially in section, showing the manner in which multiple filter units may be interconnected in accordance with the present invention.

Referring to FIG. 1, a filter constructed in accordance with the present invention is generally indicated by reference numeral 10. This filter comprises an open cylindrical tank 12 which is separated into a lower filter chamber 14 and an upper backwash storage chamber 16 by a generally conical partition 18. The filter chamber 12 is divided into an upper inlet compartment 20, a central filter bed 22, and a lower underdrain compartment 24. The filter bed 22 is separated from the underdrain compartment 24 by a false bottom member 26 having a multiplicity of openings 28, each of which has strainer means 30 to prevent the filter media from passing into the underdrain compartment 24.

Liquid to be filtered is delivered to the filter 10 through an inlet pipe 32, from which is passes through a head box 34, the details of which are hereinafter described. The incoming liquid passes through a downtake pipe 36 to a transfer conduit 38, which delivers incoming liquid to the inlet compartment 30. The inlet pipe 32, head box 34, downtake pipe 36, and transfer conduit 38 represent a specific embodiment of the "first pipe means" referred to in the foregoing general description of the invention.

A baffle 40 is provided to distribute incoming liquid from the transfer conduit 38 evenly over the filter bed 22 in order to prevent channeling and to provide maximum utilization of the filter media.

As shown in the drawing, the downtake pipe 36 communicates with the transfer conduit 38 at a T-connection 42. The transfer conduit 38 continues downwardly past this T-connection 42, and communicates with a drain. The transfer conduit 38 has a valve 44 below the T-connection 42. When the valve 44 is closed, liquid flows into the filter chamber 14, while when the valve 44 is open, the incoming liquid will flow directly to the drain. This permits the incoming liquid to be diverted to the drain during the filter cleaning steps described herein.

A service outlet pipe 46 having a valve 48 communicates with the underdrain compartment 24 so that liquid may be delivered from the lower outlet side of the filter chamber 14 to service. The service outlet pipe 46 is referred to in the foregoing general description as "second pipe means."

In accordance with a preferred embodiment of the present invention, the service outlet pipe 46 has an inverted U-shaped configuration, as shown in the drawings. Thus, the service outlet pipe 46 forms an inverted U-shaped siphon pipe. The top of the service outlet pipe 46 is at least as high as the top of the filter bed 22. An air vent pipe 50 having a valve 52 communicates with the service outlet pipe 46 providing means for breaking the siphon. Liquid level sensing means 54 are provided in the inlet compartment, the sensing means being operatively connected to the valve 52 on the air vent pipe 50 to open the valve 52 when the liquid in the inlet compartment 20 falls below the liquid level sensing means 54.

A backwash delivery pipe 56 having a valve 58 provides communication between the service outlet pipe 46 and the backwash storage chamber 16. Because the backwash delivery pipe 56 communicates with the service outlet pipe 46, it thereby also communicates with the lower outlet side of the filter chamber 14 and the backwash storage chamber 16. Thus, the backwash delivery pipe 56 is a specific embodiment of the "third pipe means" referred to in the foregoing general description of the invention.

Desirably, the cleaning cycle may be initiated on a time sequence, or may be initiated when the filter bed 22 collects a predetermined amount of solids as indicated by a rise in the pressure within the inlet compartment 20. To this end, a high level control pipe 60 communicates with the inlet compartment 20. The control pipe 60 is a vertical pipe extending through the backwash storage chamber 16, as shown in the drawings, or positioned outside the filter 10. At its upper end, above the backwash storage chamber 16, the high level control pipe 60 has a high level control switch 62 with a probe 64. This switch 62 is actuated when liquid, rising in the high level control pipe 60, contacts the probe 64. The probe 64 is preferably of the conductivity type, and suitable designs are well known in the art. The point at which the high level sensing switch 62 is actuated represents a predetermined pressure drop across the filter bed 22. The high level sensing switch 62 is connected to automatic control means 66 by electric wires (not shown) or the like, which automatically control the filter 10 of the present invention as hereinafter described.

In the preferred embodiment shown, means are provided for delivering a gas under pressure to the lower outlet side of the filter chamber 14. In this instance, these means comprise an air blower 68 and an air pipe 70 providing communication between the air blower 68 and the underdrain compartment 24.

The filter apparatus 10 shown in the drawings is of a low-profile design, that is, it does not have an elevated head box. Instead, the head box 34 is located approximately at the upper liquid level of the backwash storage chamber 16. Such a non-elevated head box may be employed because liquid does not pass upwardly to the top level of the backwash storage 16 before being delivered to service, as was conventional in many filters of the prior art.

As shown in the drawings, the head box 34 has a first weir 74 and a second weir 76. The first weir 74 is adjacent to the inlet pipe 32, so that liquid from the inlet pipe 32 first flows over the first weir 74 to the downtake pipe 36. The second weir 76 is adjacent to the first weir 74, and is preferably slightly higher than the first weir 74. Thus, if the downtake pipe 36 is unable to accept all of the liquid coming into the inlet pipe 32, the liquid passes over the second weir 76. Liquid passing over this second weir 76 is delivered to an overflow outlet pipe 78, which communicates with a drain or with other filters, as shown in FIG. 6. As will be seen from the following description of the operation of the apparatus, liquid will be caused to flow over the second weir 76 during the backwash storage chamber refill cycle, when the liquid level in the backwash storage chamber 16 rises to approximately the level of the head box 34.

In the preferred embodiment, all of the valves will be automatic valves, and will be connected to the control means 66 by suitable means (not shown) such as electric wires, fluidic connections, or the like. Similarly, the air blower 68 and liquid level sensing means 54 will communicate with the control means 66 by similar means, not shown in the drawings. The manner in which such connections may be made is, of course, well known to those skilled in the art.

In operation, during the service cycle, the backwash storage chamber 16 is full and all valves are closed except for the valve 48 on the service outlet pipe 46. Liquid to be filtered passes through the inlet pipe 32 to the head box 34, where it flows over the first weir 74, providing a constant pressure head. Any excess flow during the service cycle will be diverted over the second weir 76 to the overflow outlet pipe 78. The incoming liquid passes through the downtake pipe 36, into the transfer conduit 38, and then into the inlet compartment 20 of the filter chamber 14. The liquid passes downwardly through the filter bed 22, as shown by the arrows, through the openings 28, and into the underdrain compartment 24. The liquid then passes through the service outlet pipe 46 to service.

As the incoming liquid passes over the first weir 74, air will be entrained therein. This entrained air is removed from the liquid through a vent pipe 80, which communicates with an upper portion of the transfer conduit 38. The air vent pipe 80 has a check valve 81, which prevents any downward flow of gas through the vent pipe 80.

As particles are filtered from the incoming liquid and collected by the filter bed 22, the pressure within the inlet compartment 20 will gradually rise until it reaches a predetermined level. This predetermined level is sensed by the probe 64 and high level sensing switch 62, which delivers a signal to the control means 66. The control means 66 then provides the necessary signal to begin the cleaning cycle.

The cleaning cycle is initiated by a drain-down step, as shown in FIG. 2. To initiate this step, the valve 44 on the transfer conduit 38 is opened, so that the incoming liquid is delivered directly to the drain. Liquid drains out of the inlet compartment 20 until it reaches the level of the liquid level sensing means 54. When this level is reached, a signal is provided to open the valve 52 on the air vent pipe 50. The opening of the valve 52 breaks the siphon in the service outlet pipe 46 so that flow through the service outlet pipe 46 ceases.

Next, as signaled by the control means 66, the valve 48 on the service outlet pipe 46 and the valve 52 on the air vent pipe 50 are closed. The air blower 68 is then started to begin the air scouring step as shown in FIG. 3. The air output of the blower 68 when operating is adjusted so that it is greater than the liquid head in the underdrain compartment 24 during the gas scouring cycle. The air entering the underdrain compartment 24 passes up through the filter bed 22 at a relatively high velocity. This air, indicated by air bubbles 82, agitates the filter bed 22 and causes foreign particles which have collected therein to become disengaged from the filter media. As the air passes through the filter bed 22, filter media will become entrained in the air. However, the filter media will disengage from the air when it enters the air space in the upper part of the filter chamber 14. In this air space, the filter media entrained in the scouring air will drop back into the liquid in the filter chamber 14. The baffle 40 also assists in disengaging filter media from the scouring air. The scouring air passes out of the filter chamber 14 through the transfer conduit 38.

After a predetermined period of time, as determined by a timer 84 in the control means 66, the air blower 68 will automatically be turned off, and the backwash cycle is started. This cycle is shown in FIG. 4. To initiate the backwash cycle, valve 58 on the backwash delivery pipe 56 is opened. Water from the backwash storage chamber 16 will flow under the influence of gravity through the backwash delivery pipe 56 and the service outlet pipe 46 into the underdrain compartment 24. The backwash liquid then flows upwardly through the filter bed 22, into the inlet compartment 20. As the backwash liquid rises in the inlet compartment 20, the liquid level sensing means 54 will cause the valve 52 on the air vent pipe 50 to close. The backwash liquid is delivered to the drain through the transfer conduit 38. This flow of backwash liquid upwardly through the filter bed 22 removes foreign material which accumulated therein during the service cycle and carries it away. The check valve 81 prevents air from being drawn into the transfer conduit 38, and this prevents any breaking of the siphon during the latter part of the backwash cycle (i.e., when the water level in the backwash storage chamber 16 falls below the upper level of the transfer conduit 38). The end of the backwash cycle may be sensed in a number of ways, as, for example, by a level sensor (not shown) in a lower portion of the backwash storage chamber 16. A simple method is simply to set the timer 84 to provide sufficient time for the backwash cycle to be accomplished.

Referring to FIG. 5, the backwash cycle is followed by a backwash chamber refill cycle during which the backwash storage chamber 16 is refilled with filtered liquid. To initiate this cycle, the valve 44 on the transfer conduit 38 is closed, so that liquid may again flow into the filter chamber 14 through the transfer conduit 38. As shown in FIG. 5, the liquid passes downwardly through the filter bed 22 into the service outlet pipe 46, the backwash delivery pipe 56, and into the backwash storage chamber 16.

When the backwash storage chamber becomes filled to the desired level, liquid will begin to flow over the second weir 76, as shown by the phantom arrow in FIG. 5.

If the filter 10 is being operated on a time sequence, as may be the case when a number of filters are being employed. The overflow liquid that passes through the overflow pipe 78 may be simply delivered to the drain. However, the flow of liquid through the overflow pipe 78 also provides means for sensing the filling of the backwash storage chamber 16. Thus, a flow sensor 86 may be provided to detect a predetermined level of flow within the overflow outlet pipe 78, providing a signal to the control means 66, which reinitiates the service cycle. The service cycle is re-initiated by simply closing the valve 58 on the backwash delivery pipe 56 and opening the valve 48 on the service outlet pipe 46.

It is noted that the valve 52 acts as a safety means, preventing the emptying of the inlet compartment 20 during periods of low flow. That is, any time the liquid level in the inlet compartment 20 drops to the level of the liquid level sensing means 54, the valve 52 will be opened, and draining of the filter chamber 14 will be prevented.

It is also noted that when the head box 34 shown in the drawings is employed, it is possible to design transfer conduit 38, so that communication with the drain need not be provided. In this instance, either the downtake pipe 36 or the transfer conduit 38 has a valve to interrupt the flow of liquid to the filter chamber 14. This valve is open during the service and backwash chamber refill cycles, and is closed during the drain down, air scour, and backwashing cycles. When this valve is closed, liquid will simply be diverted over the second weir 76 in the manner previously described.

The filter apparatus 10 of the present invention may be used to filter a variety of liquids, as will be appreciated by those skilled in the art. Exemplary liquids include water streams, sugar solutions, hydrocarbon streams, and the like.

The particular filter media employed is a matter of choice, the selection being dependent upon the liquid to be filtered and the impurities contained therein.

Scouring gases other than air may be employed, such as nitrogen, oxygen, chlorine, and the like, although air is preferred because of lower operating costs.

The liquid level sensor 54 may be any of a variety of design, as is well known to those skilled in the art. The liquid level sensor 54 may suitably be a pressure sensor, as there will be a sharp change in pressure when the level of liquid within the inlet compartment 20 falls past the liquid level sensing means 54. Other types of liquid level sensors may also be employed, such as conductivity sensors, sonic probes, and the like, as is well understood by those skilled in the art.

Obviously, many modifications and variations of the invention as hereinbefore set forth will occur to those skilled in the art, and it is intended to cover in the appended claims all such modifications and variations as fall within the true spirit and scope of the invention.

I claim:

1. An improved self-backwashing filter apparatus comprising: means defining a filter chamber having an upper inlet side and a lower outlet side with filter means therebetween; means defining a backwash storage chamber above said filter chamber, said backwash storage chamber supplying liquid under sufficient pressure to force said liquid upwardly through said filter bed; first pipe means for delivering inlet liquid to said upper inlet side of said filter chamber, said first pipe means comprising an inlet pipe, a head box, and a downtake pipe, said head box having a pair of weirs therein, said weirs being so constructed and arranged that liquid from said inlet pipe flows over a first weir to said downtake pipe, and overflow liquid flows over said second weir when said downtake pipe fails to accept all of the liquid that flows over said first weir; second pipe means comprising an inverted U-shaped siphon pipe for delivering liquid from said lower outlet side of said filter chamber to service, the top of said siphon pipe being at least as high as the top of said filter means; air vent means communicating with said siphon pipe; liquid level sensing means in said inlet compartment, said sensing means being operatively connected to said air vent means to open said air vent means when said liquid level falls past said liquid level sensing means; and third pipe means providing communication between said lower outlet side of said filter chamber and said backwash storage chamber.

2. The filter apparatus as defined in claim 1 wherein said liquid level sensing means is of the pressure-responsive type.

3. The filter apparatus as defined in claim 1 further including means for delivering liquid that flows over said second weir to a drain.

4. The filter apparatus as defined in claim 1 further including means for delivering liquid that flows over said second weir to other filter means.

5. An improved self-backwashing filter apparatus comprising: means defining a filter chamber having an upper inlet side and a lower outlet side with filter means therebetween; means defining a backwashing storage chamber above said filter chamber, said backwash storage chamber supplying liquid under sufficient pressure to force said liquid upwardly through said filter means; first pipe means for delivering liquid to said upper inlet side of said filter chamber, said first pipe means comprising an inlet pipe, a head box, and a downtake pipe, said head box having a pair of weirs therein, and said weirs being so constructed and arranged that liquid from said inlet pipe flows over a first weir to said downtake pipe, and overflow liquid flows over a second weir when said downtake pipe fails to accept all of the liquid that flows over said first weir; second pipe means for delivering liquid from said lower outlet side of said filter chamber to service; and third pipe means providing communication between said lower outlet side of said filter chamber and said backwash storage chamber.

6. The filter apparatus as defined in claim 5 further comprising means for delivering liquid that flows over said second weir to a drain.

7. The filter apparatus as defined in claim 5 further comprising means for delivering liquid that flows over said second weir to other filter means.

8. The filter apparatus as defined in claim 5 further comprising sensing means for sensing the flow of liquid over said second weir, and for providing a signal to re-initiate a service cycle.

* * * * *